(12) United States Patent
Lin

(10) Patent No.: US 6,257,987 B1
(45) Date of Patent: Jul. 10, 2001

(54) STACKABLE TRANSMISSION SHAFT

(75) Inventor: Yu-Tse Lin, Taipei (TW)

(73) Assignee: Aurise Inc., Yun-Lin Hsien (TW)

( * ) Notice: Subject to any disclaimer, the term of this patent is extended or adjusted under 35 U.S.C. 154(b) by 0 days.

(21) Appl. No.: 09/432,385

(22) Filed: Nov. 1, 1999

(51) Int. Cl.[7] ............................................. F16D 3/18
(52) U.S. Cl. ................................. 464/149; 464/179
(58) Field of Search .................................. 464/147, 149, 464/179; 403/301, 345, 364; 372/14, 108

(56) References Cited

U.S. PATENT DOCUMENTS

| | | | |
|---|---|---|---|
| 1,314,601 | * 9/1919 | McCaskey | 464/149 X |
| 1,866,714 | * 7/1932 | King | 464/147 X |
| 2,491,820 | * 12/1949 | Leibing et al. | 464/147 |
| 3,203,285 | * 8/1965 | Schmidt | 464/149 X |

* cited by examiner

Primary Examiner—Lynne H. Browne
Assistant Examiner—Greg Binda
(74) Attorney, Agent, or Firm—A & J

(57) ABSTRACT

A stackable transmission shaft includes a plurality of cylindrical members each having a top formed with a diametrical projection, a bottom formed with a diametrical recess, and a center formed with an axial through hole, the projection having an inverted V-shaped top and the diametrical recess being configured to receive the diametrical projection and arranged to make an angle of 90 degrees with respect to the diametrical projection.

1 Claim, 4 Drawing Sheets

STACKABLE TRANSMISSION SHAFT

BACKGROUND OF THE INVENTION

1. Field of the Invention

This invention is related to a stackable transmission shaft and in particular to one which can be easily engaged with another.

2. Description of the Prior Art

The conventional transmission devices include belts, gears, transmission shafts with universal joints. Belts and gears are generally used for reduction devices and the axis of the driver such as a motor is not aligned with that of the driven member. The universal joint is a device which allows rotary drive to be transmitted through an angle. However, blockage will often happen in such transmission devices in case of bidirectional rotations, especially under high speed, thereby making them unfit for use with accurate equipments such as laser levels and the like.

Therefore, it is an object of the present invention to provide an improvement in the structure of a transmission shaft which can obviate and mitigate the above-noted drawbacks.

SUMMARY OF THE INVENTION

This invention is related to an improvement in the structure of a transmission shaft.

It is the primary object of the present invention to provide a stackable transmission shaft which can be easily engaged with another.

It is another object of the present invention to provide a stackable transmission shaft which can be used for transmitting power directly from a motor or the like to a driven member.

It is still another object of the present invention to provide a stackable transmission shaft which is durable in use.

It is still object of the present invention to provide a stackable transmission shaft which can be accurately connected with a driven member.

It is a further object of the present invention to provide a stackable transmission shaft which can be easily adjusted to remove blockage.

According to a preferred embodiment of the present invention, a stackable transmission shaft includes a plurality of cylindrical members each having a top formed with a diametrical projection, a bottom formed with a diametrical recess, and a center formed with an axial through hole, the protection having a inverted V-shaped top and the diametrical recess being configured to receive the diametrical projection and arranged to make an angle of 90 degrees with respect to the diametrical projection.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
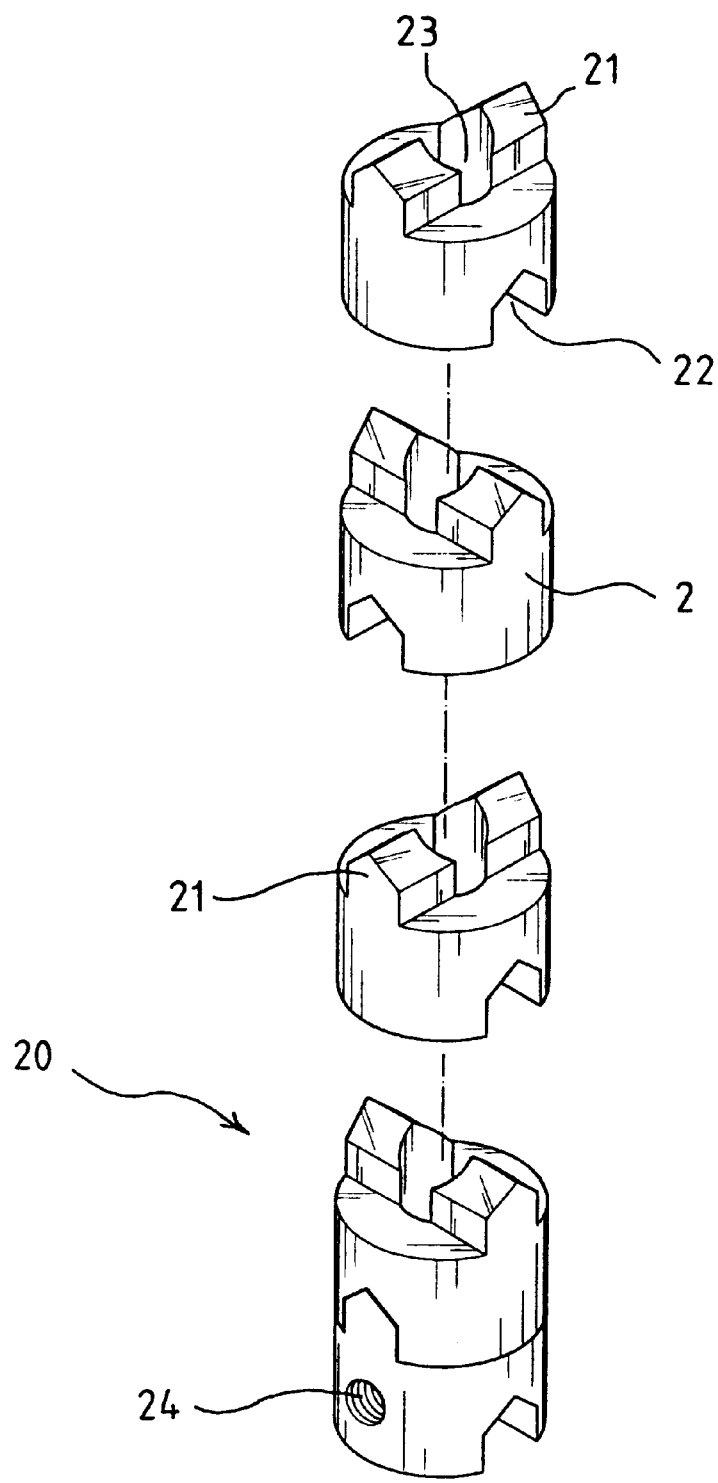
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to the drawings and in particular to FIG. 1 thereof, the stackable transmission shaft 20 according to the present invention comprises a plurality of cylindrical members 2 each having a diametrical projection 21 at the top, a diametrical recess 22 at the bottom, and an axial through hole 23 at the center. The diametrical protection 21 is formed with an inverted V-shaped top and the diametrical recess 22 is configured to receive the diametrical projection 21 and arranged to make an angle of 90 degrees with respect to the diametrical projection 21.

In assembly, a plurality of the cylindrical members 2 are stacked on one another so that the cylindrical member 2 at the upper position is stacked on the cylindrical member 2 at the lower position 2 with the diametrical recess 22 of the former engaged with the diametrical projection 21 of the latter thereby assembling the cylindrical members 2 into a transmission shaft 20.

Figure 2:
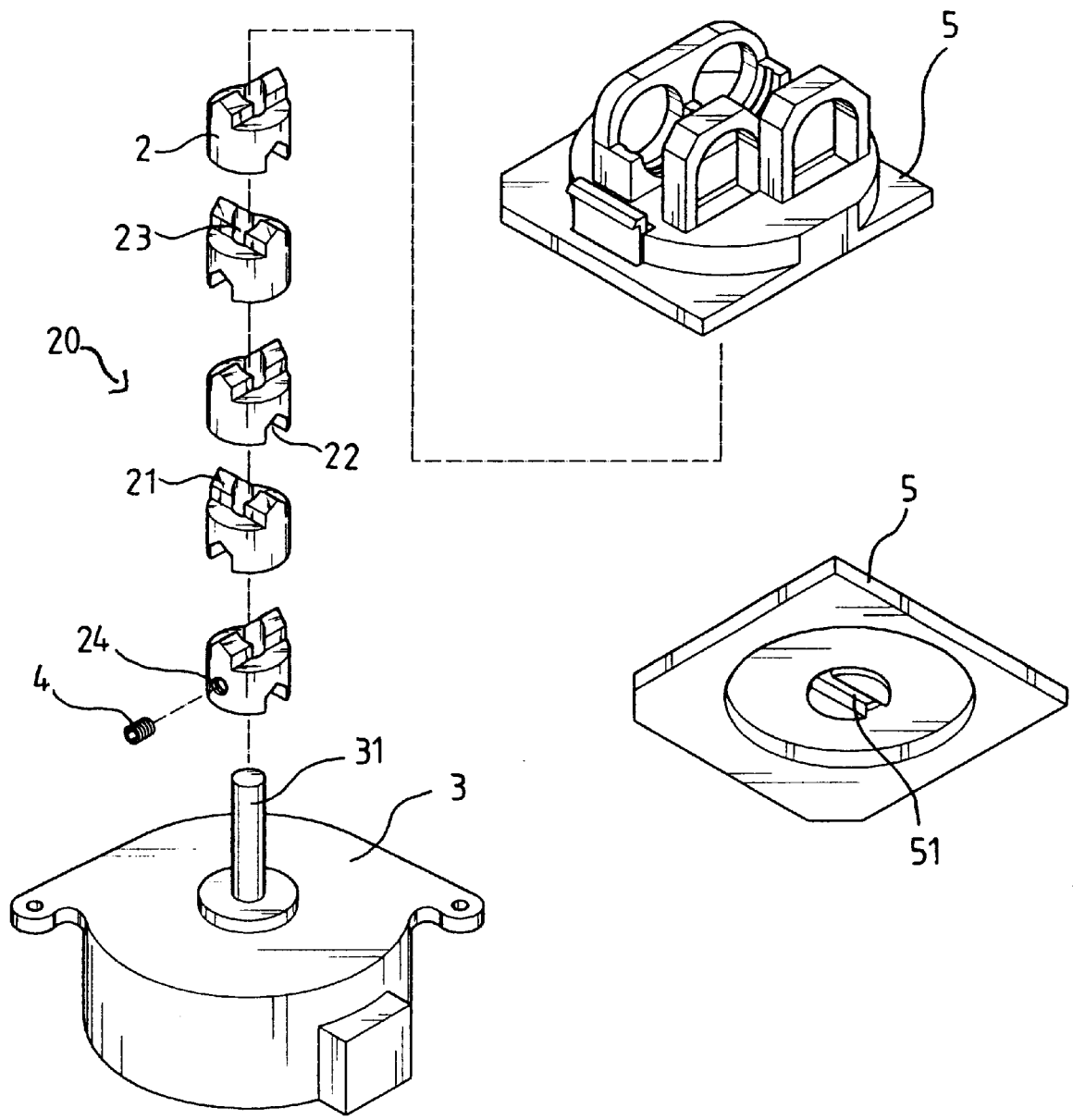
FIG. 2 illustrates the assembly of the present invention.
Figure 3:
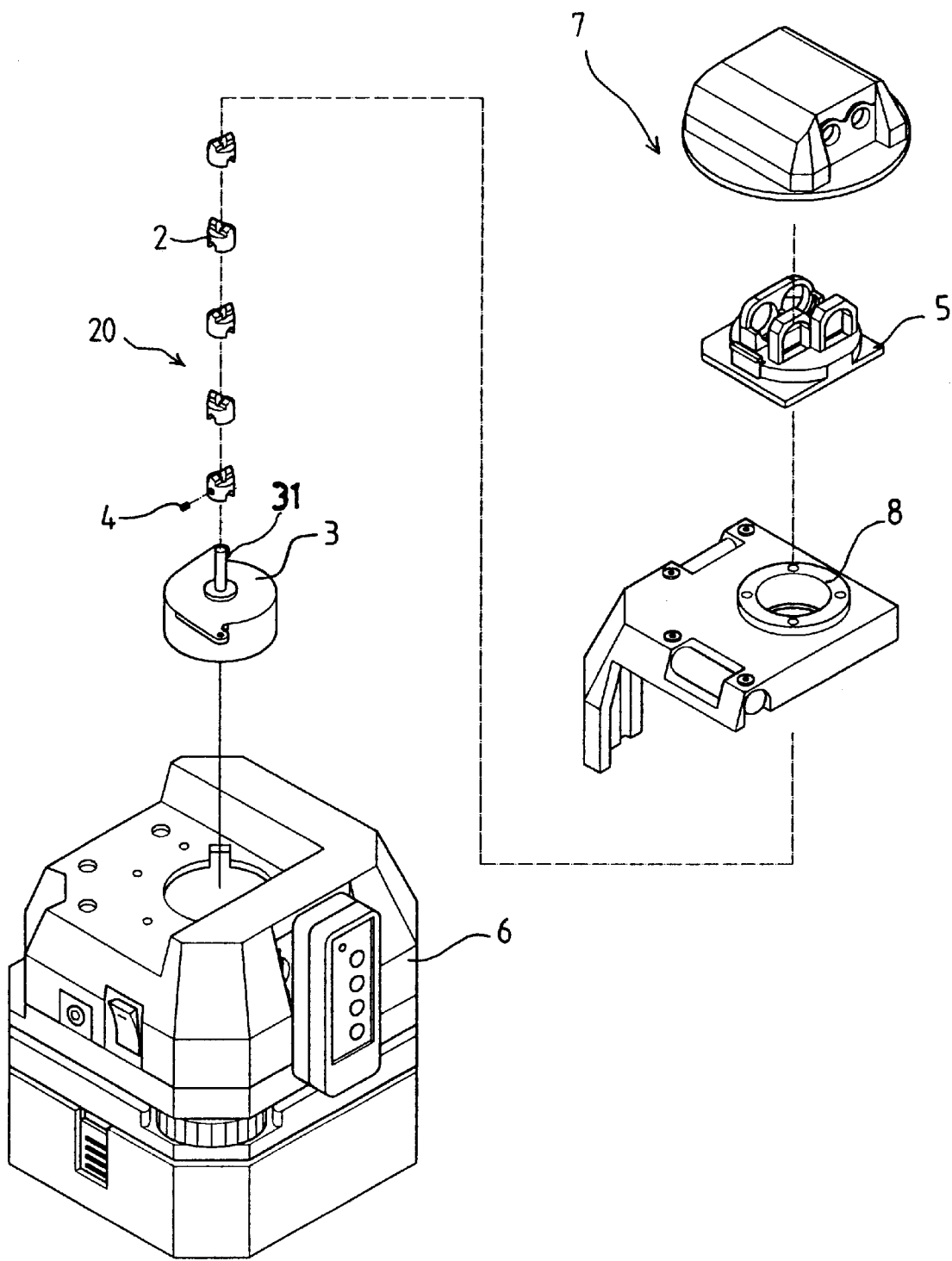
FIG. 3 illustrates an application of the present invention.
Figure 4:
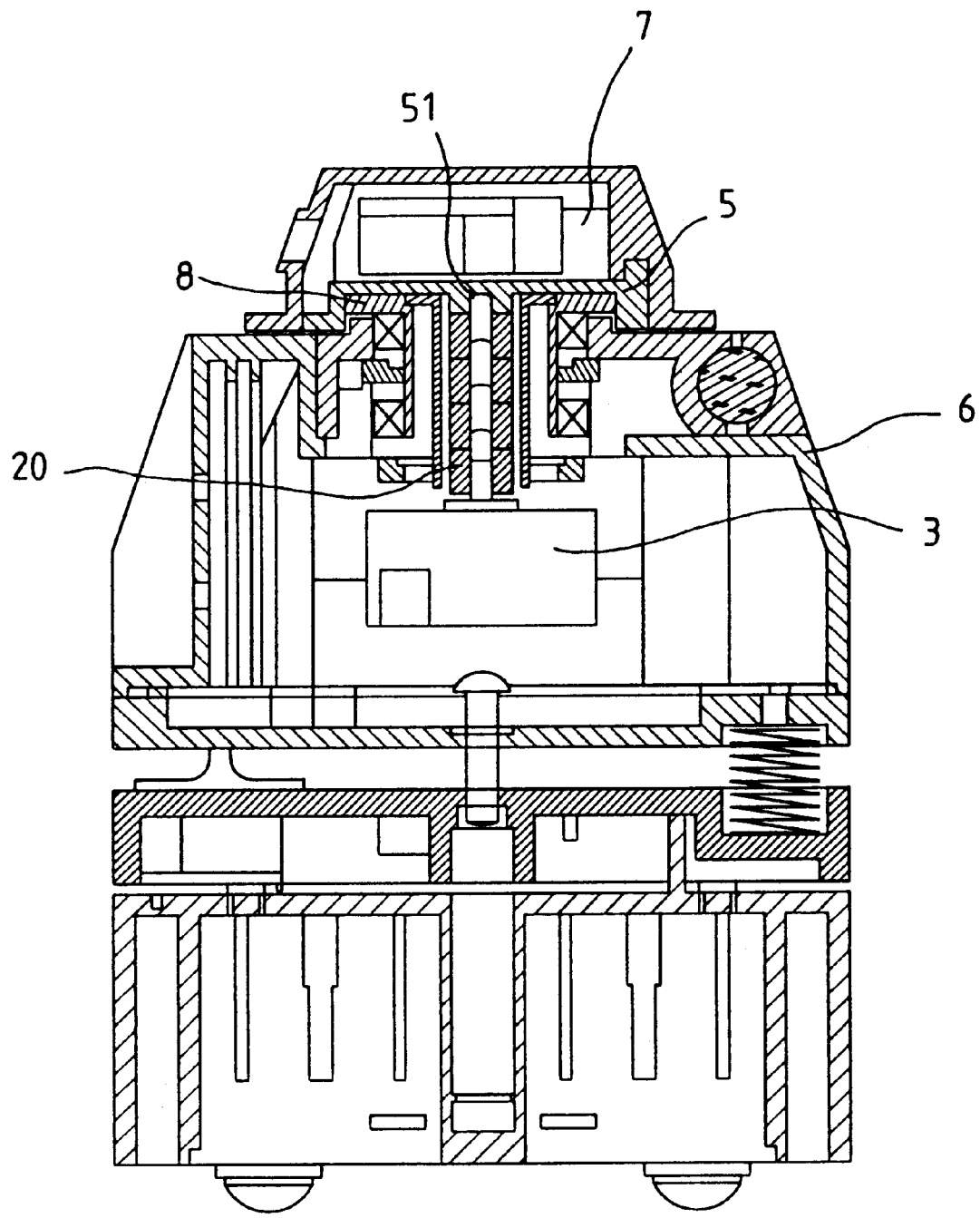
FIG. 4 is a sectional view of a laser level equipped with the present invention.

FIGS. 2, 3 and 4 illustrate how the transmission shaft 20 according to the present invention is applied to a laser level 6. As shown, a cylindrical member 2 is first fitted on the axle 31 of a motor 3 and then a screw 4 is turned through a radial threaded hole 24 of the cylindrical member 2 to fixedly engage the cylindrical member 2 with the axle 31, so that the cylindrical member 2 will be rotated in unison with the axle 31. The radial threaded hole 24 is communicated with the axial through hole 23. Thereafter, a plurality of cylindrical member 2 are stacked on one another to form a transmission shaft 20. The motor 3 is mounted within the central portion of the laser level 6. A sleeve 8 is fitted on the upper portion of the laser level 6 to enclose the transmission shaft 20. The laser level 6 is provided with a seat 5 which is pivotally mounted on the sleeve 8. A laser module 7 is installed on the seat 5. The seat 5 is formed at the bottom with a diametrical recess 51 which is configured to receive the diametrical projection 21 of the cylindrical member 2 at the uppermost position. As the lowermost cylindrical member 2 of the transmission shaft 20 is fixedly mounted on the axle 31 of the motor 3 and the uppermost cylindrical member 2 of the transmission shaft 20 is engaged with the seat 5, the transmission shaft 20 will be kept in place and the cylindrical members 2 will not disengaged from one another. When in rotation, the transmission shaft 20 will reduce the vibration produced by the motor 3 and will directly transmit the power from the motor 3 to the seat 5. As no bearing is required for the transmission shaft 20, there will no frictional loss. The seat 5 is pivotally mounted on the rotating sleeve 8 so that the accuracy of the laser module 7 will not be influenced by the motor 3 in rotation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A stackable transmission shaft comprising a plurality of cylindrical members each having a top formed with a diametrical projection, a bottom formed with a diametrical recess, and a center formed with an axial through hole, said diametrical projection having an inverted V-shaped top and the diametrical recess being configured to receive said diametrical projection and arranged to make an angle of 90 degrees with respect to said diametrical projection, a lowermost one of said cylindrical members having a radial threaded hole for engaging a screw thereby enabling an output axle of a motor to be fixedly engage with said lowermost cylindrical member.

* * * * *